INVENTOR.
Robert D. Bremer
BY
His Attorney

United States Patent Office 2,799,767
Patented July 16, 1957

2,799,767
ELECTRIC HEATER ARRANGEMENT

Robert D. Bremer, Dayton, Ohio, assignor to General Motors Corporation, Detroit, Mich., a corporation of Delaware Application November 2, 1953, Serial No. 389,739

5 Claims. (Cl. 219—38)

This invention relates to a domestic appliance and more particularly to a heating arrangement for electric water heaters.

In the past it has been customary to solder or weld tubular sheath heaters to a mounting plate which is removably fastened within an aperture in a water tank. It is possible to make this connection by soldering or welding because the ends of the sheath have not been closed until after the soldering or welding operation.

It is an object of my invention to provide an inexpensive mounting arrangement in which the heater is properly sealed to the mounting plate without employing any high temperature sealing process such as soldering or welding so that insulators at the end of the sheath may be inserted in earlier operations and yet will not be overheated.

It is another object of my invention to provide an inexpensive mounting arrangement in which a seal is provided by an inexpensive gasket holding arrangement and a simple inexpensive gasket of resilient rubber-like material.

It is another object of my invention to provide an inexpensive mounting arrangement which provides added support for the heater so that vibration of the heater upon its mounting during transportation is reduced sufficiently that annealing of the sheath is not required to prevent breakage.

In the form shown these objects are attained by providing a metal mounting plate to which is welded or soldered two sleeves of the same material. The two ends of the sheath heater extend through the sleeves and the sleeves are each provided with an inwardly extending extension which is long enough to provide sufficient added support for the heater to prevent breakage without annealing the sheath. The outer ends of the sleeves are provided with a gasket recess containing a gasket of a suitable synthetic rubber.

Further objects and advantages of the present invention will be apparent from the following description, reference being had to the accompanying drawings wherein a preferred form of the invention is clearly shown.

Figure 1:
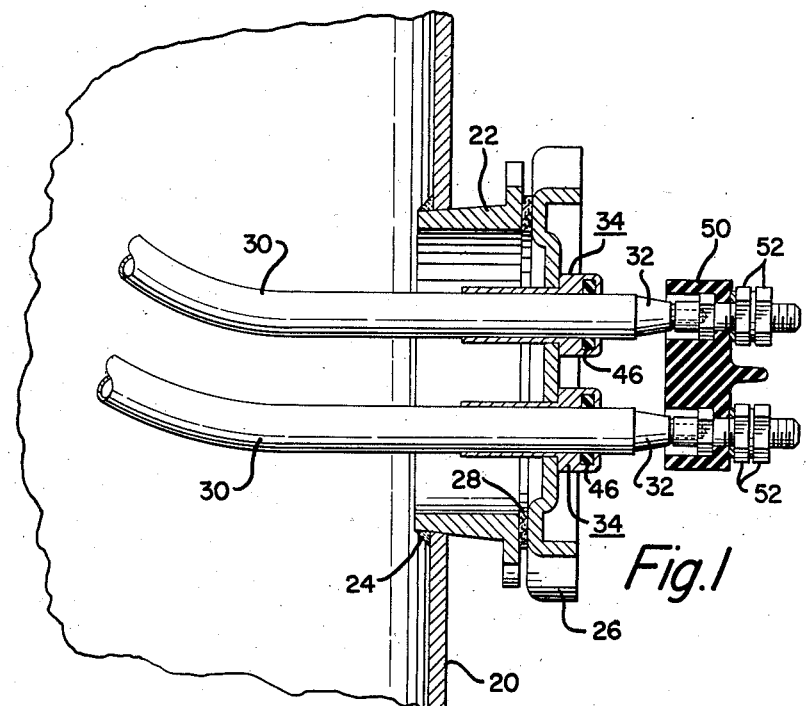
Figure 1 is a fragmentary sectional view of a water heater embodying one form of my invention.
Figure 2:
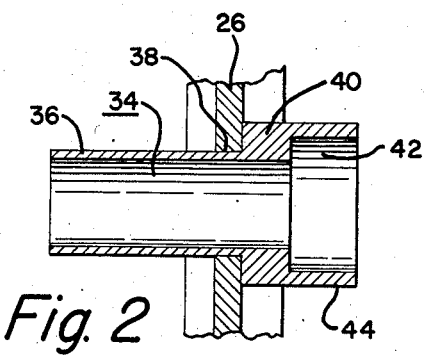
Figure 2 is an enlarged sectional view showing a sleeve as it is initially attached to the mounting plate.
Figure 3:
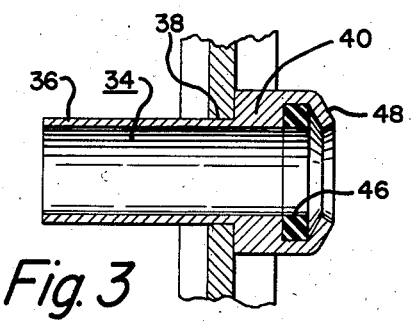
Figure 3 is a view similar to Figure 2 showing a sleeve provided with a gasket of synthetic rubber and a portion of the skirt of the enlarged end of the sleeve spun over to hold the gasket loosely in place.

Referring now to the drawing and more particularly to Figure 1 there is shown a fragmentary portion of the water heater tank 20. This tank 20 may be made of copper or galvanized steel or enameling iron coated with porcelain. The wall portion shown of the tank is provided with an aperture in which is lodged a mounting collar 22 welded as indicated by the reference character 24 in sealing connection with the adjacent wall portions of the tank 20. Fastened to the supporting collar 22 by screws or bolts is the mounting plate 26 which is sealed to the collar 22 by a suitable gasket 28. A tubular sheath electric heater 30 is supported by the mounting plate 26 and has a heating portion extending within the interior of the tank 20. It has been customary to seal the ends of these tubular sheathed heaters with glass or ceramic insulators. However, I find it advantageous to seal the open ends of the heater 30 with the plugs 32 which are of some suitable type of synthetic rubber such as Buna N, or neoprene, or silicone. These synthetic rubber insulators are preferably held in place within the ends of the sheath of the heater 30 by the swaging of the sheath.

To provide an improved mounting for such a heater I provide the two sleeves 34. These sleeves include a thin small diameter cylindrical portion 36 having an interior diameter just slightly larger than the outer diameter of the tubular sheath heater 30. The difference may be so small as to provide a press fit or interference fit.

The outer diameter of this portion 36 is just small enough to fit tightly within the aperture 38 in the mounting plate 26. On the outer side of the mounting plate 26 the sleeves 34 are provided with an enlarged outer diameter portion 40 having a right angled shoulder which butts against the outer face of the wall portion of the mounting plate 26. This shoulder is welded or soldered to the mounting plate 26 as a first step in the assembly. The sleeve 36 extends inwardly far enough to form a firm support for the heater 30 so as to prevent breakage near the mounting when the tanks are being shipped to customers. The outer end of the large diameter portion of the sleeve 34 is provided with a recess 42. This recess provides a thin cylindrical flange 44.

Figure 4:
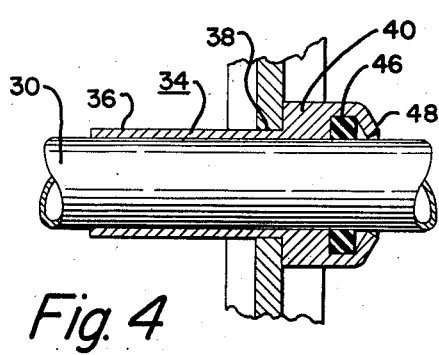
Figure 4 is a view similar to Figures 2 and 3 showing the portion of the tubular sheath heater extending through the sleeve.
Figure 5:
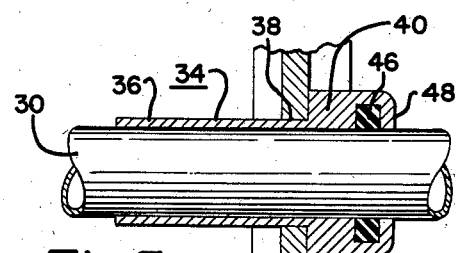
Figure 5 shows the clamping of the inwardly turned flange of the sleeve into sealing and squeezing engagement with the gasket of synthetic rubber.

After the sleeve 34 is bonded to the mounting plate 26 there is placed in the recess 42 against the internal shoulder thereof a ring shaped gasket 46 of near suitable natural or synthetic rubber such as Buna N rubber, or silicone rubber or neoprene. After the gasket 46 is inserted, the outer portion of the cylindrical flange 44 is spun over inwardly to form the inwardly extending flange 48 which extends inwardly at an angle of about 60° to loosely hold the gasket 46 in the recess which is formed by this spinning operation. Following this, the two ends of the heater 30 are pushed through the sleeve 34 as shown in Figure 4. The loose fit of the gasket 46 makes this possible.

After this the inwardly turned flange 48 is pressed or spun until it is flattened against the outer face of the gasket 46 sufficiently to squeeze the gasket 46 into sealing relationship with the adjacent outer surface of the heater 30. This seals the gasket 46 to the sleeve 34 since it is tightly held in the gasket recess enclosed by the inwardly turned flange 48. This squeezing of the gasket 46 forces it into sealing contact with the adjacent outer periphery of the sheath of the heater 30. Following this the insulating block 50 may be fastened to the terminals of the heater 30 by the nuts 52.

This provides a simple inexpensive durable heating arrangement since the heater is provided with a supporting arrangement which distributes the supporting stress over a considerable area of the sheath through the use of the long sleeves 34. This eliminates the need for an annealing operation which corrodes and dulls the outer surface of the sheath. The use of the synthetic rubber insulators eliminates the danger of the cracking of the insulator which was formerly sometimes encountered with glass or ceramic material. The resilient gasket of rubber-like material provides an effective water tight seal between the mounting plate and the heater.

In accordance with the provisions of rule 78a, reference is made to the following prior filed application, S. N. 338,464, filed February 24, 1953.

While the form of embodiment of the invention as herein disclosed constitutes a preferred form, it is to be understood that other forms might be adopted as may come within the scope of the claims which follow.

What is claimed is as follows:

1. An electric heating arrangement for a pressure vessel including a supporting means adapted to be sealed to a wall portion of a pressure vessel, elongated supporting sleeve means extending through and on opposite sides of said supporting means and being sealed to the supporting means, a tubular sheath electric heater extending through and fitting snugly in said sleeve means and having a heating portion for the interior of the pressure vessel extending on one side of the sleeve means and a terminal portion extending on the other side of said sleeve means, said sleeve means being longer than the diameter of the sheath of said heater to provide a firm support for the heater, and sealing means extending around and in sealing contact with said heating means and said sleeve means.

2. An electric heating arrangement for a pressure vessel including a supporting means adapted to be sealed to a wall portion of a pressure vessel, elongated supporting sleeve means extending through and on opposite sides of said supporting means and being sealed to the supporting means, a tubular sheath electric heater extending through said sleeve means and having a heating portion for the interior of the pressure vessel extending on one side of the sleeve means and a terminal portion extending on the other side of said sleeve means, said sleeve means being longer than the diameter of the sheath of said heater to provide a firm support for the heater, and an endless gasket of a resilient sealing material extending around and in sealing contact with said heating means and said sleeve means, said sleeve means being provided with holding means making sealing contact with said gasket for holding said gasket in sealing contact with said heating means.

3. An electric heating arrangement for a pressure vessel including a metal mounting plate adapted to be sealed to a wall portion of a pressure vessel, metal elongated supporting sleeve means extending through and on opposite sides of said mounting plate and being metallically bonded to the mounting plate, a tubular sheath electric heater extending through and closely fitting within said sleeve means and having a heating portion for the interior of the pressure vessel extending on one side of the sleeve means and a terminal portion extending on the other side of said sleeve means, said sleeve means being longer than the diameter of the sheath of said heater to provide a firm support for the heater, said sleeve means being provided with an inwardly open gasket recess on one end thereof, and an endless gasket of a resilient sealing material extending around and in sealing contact with said heating means and being lodged within said gasket recess and in sealing contact with said sleeve means.

4. An electric heating arrangement for a pressure vessel including a supporting means adapted to be sealed to a wall portion of a pressure vessel, elongated supporting sleeve means extending through and on opposite sides of said supporting means and being sealed to the supporting means, one end of said sleeve means being provided with an inwardly open recess, a tubular sheath electric heater extending through said sleeve means and having a heating portion for the interior of the pressure vessel extending on one side of the sleeve means and a terminal portion extending on the other side of said sleeve means, said sleeve means being longer than the diameter of the sheath of said heater to provide a firm support for the heater, and and endless gasket of a resilient sealing material extending around and in sealing contact with said heating means and being lodged in said recess in said sleeve means, said sleeve means being provided with an inwardly turned integral flange to enclose and hold tightly said gasket.

5. An electric heating arrangement for a pressure vessel including a pressure vessel provided with supporting means sealed to one of its wall portions, elongated supporting sleeve means extending through and on opposite sides of said supporting means and being sealed to the supporting means, a loop type tubular sheath electric heater having its opposite ends extending separately through separate sleeve means and having a heating portion in the interior of the pressure vessel and terminal portions on the outside of the pressure vessel, said sleeve means being longer than the diameter of the sheath of said heater to provide a firm support for the heater, one end of said sleeve means being provided with an inwardly opening gasket recess, and an endless gasket of a resilient sealing material extending around and in sealing contact with said heating means and being tightly held within said gasket recess.

References Cited in the file of this patent

UNITED STATES PATENTS

| | | |
|---|---|---|
| 1,099,873 | Bowen | June 9, 1914 |
| 1,916,804 | McNab | July 4, 1933 |
| 1,992,855 | Bell | Feb. 26, 1935 |
| 2,486,675 | Pokras | Nov. 1, 1949 |
| 2,617,009 | Hasley | Nov. 4, 1952 |